United States Patent [19]

Huang

[11] Patent Number: 5,113,695
[45] Date of Patent: May 19, 1992

[54] PRESSURE GAUGE

[76] Inventor: Tien-Tsai Huang, No. 4, Lane 30, Wu-Chang St., Pan-Chiao City, Taiwan

[21] Appl. No.: 625,878

[22] Filed: Dec. 11, 1990

[51] Int. Cl.⁵ .................... B60C 73/02; G01L 7/18
[52] U.S. Cl. .................... 73/146.8; 73/744; 116/34 R
[58] Field of Search .............. 73/744, 146.8, 146.2, 73/146.3, 146; 116/34 R

[56] References Cited

U.S. PATENT DOCUMENTS 3,739,637  6/1973  Novak .................................. 73/744
4,384,543  5/1983  Wong ................................. 116/34 R Primary Examiner—Donald O. Woodiel
Attorney, Agent, or Firm—Ladas & Parry

[57] ABSTRACT

A pressure gauge has a device which can be pre-arranged to indicate the required pressure in a connected tire, and releases the excessive pressure if there should by any.

6 Claims, 5 Drawing Sheets

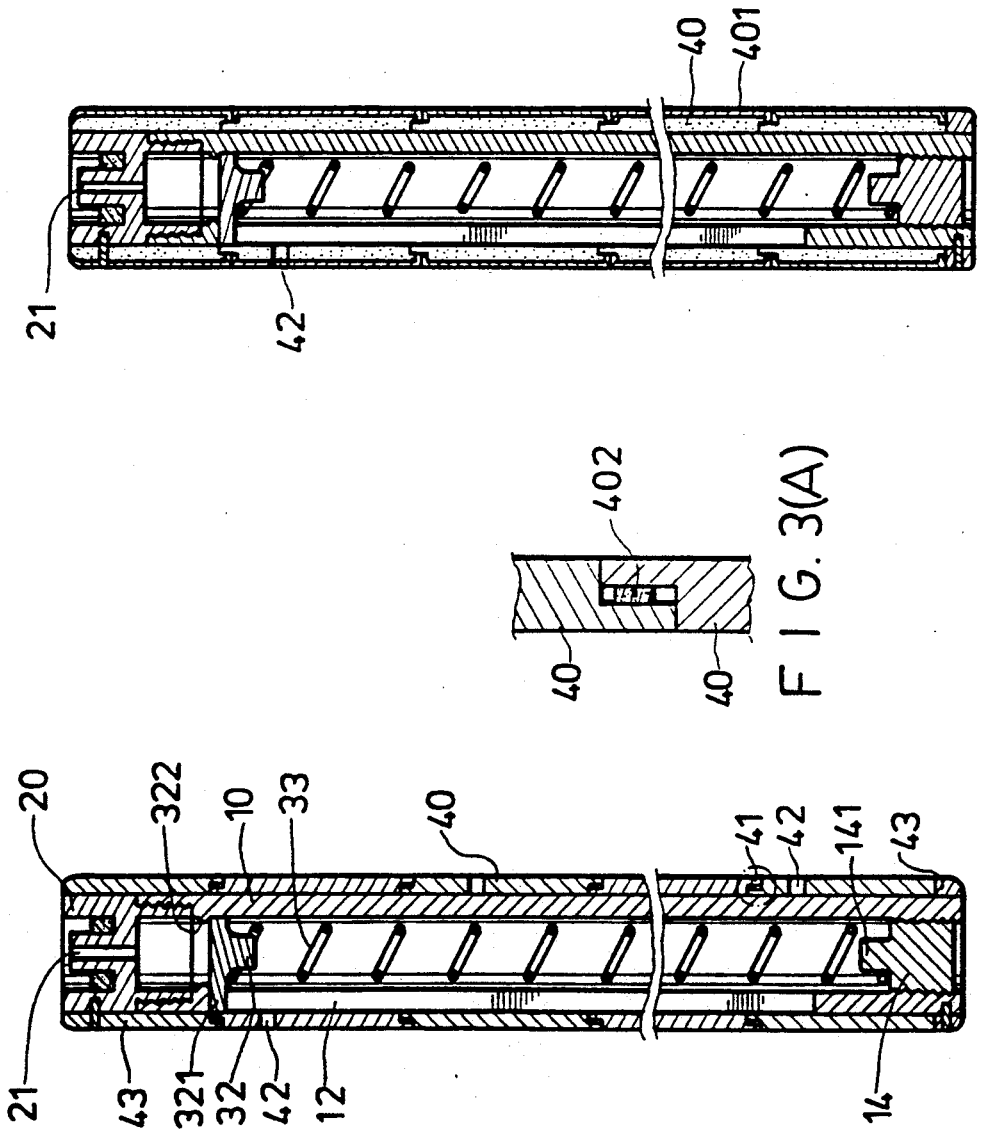

PRESSURE GAUGE

BACKGROUND OF THE INVENTION

1. Field of the Invention

The invention relates to a pressure gauge, more particularly, to a pressure gauge having marked means thereon which can be pre-arranged so as to indicate a predetermined pressure of a pneumatic tire and at the same time relieve excessive pressure by releasing air from the same.

2. Description of the Related Art

Pressure gauges can generally be divided into two kinds. The first kind is a pen-type, and the other type has pressure indicator on a scale board. Presently, pen-type pressure gauges are much more convenient to use and are preferred by many users. They mainly includes a valve means and a slide means therein, such that when the valve means is connected to an inflating valve of a pneumatic tire, the pressure of which we want to know, the slide means slides out of the pressure gauge indicating the pressure of the pneumatic tire.

There exist already several kinds of pen-type pressure gauges in the market. Each of them, though, can indicate the pressure of a connected tire, but lacks a means to relieve excessive pressure if there should be any. Besides, said pressure gauge can not be pre-arranged to show the required or optimum amount of pressure of a connected tire.

SUMMARY OF THE INVENTION

Therefore, it is the main object of the present invention is to provide a pressure gauge having means which can be pre-arranged to show the required amount of pressure of a connected tire and at the same time relieve excessive pressure from the connected tire, if there should be any.

Accordingly, the pressure gauge includes a sleeve member sealingly enclosing an elongated tubular member which has a valve means to be connected to a tire, a resilient means disposed within the same, and a communication means. The sleeve member has pressure indicating means thereon, which is in communication with the communication means of the elongated tubular member and which can be pre-arranged in such a way so as to show a required amount of pressure of a connected tire and at the same time relieve the excessive pressure by releasing air if there should be any such excess pressure in the connected tire.

BRIEF DESCRIPTION OF THE DRAWINGS

Other features and advantages of the present invention will become apparent in the following detailed description, including drawings, all of which a non-limiting form of the invention, and of which:

FIG. 3, 3(A) and 3(B) are cross sectional views of the pressure gauge of FIG. 2.

DETAILED DESCRIPTION OF THE PREFERRED EMBODIMENT

Figure 1:
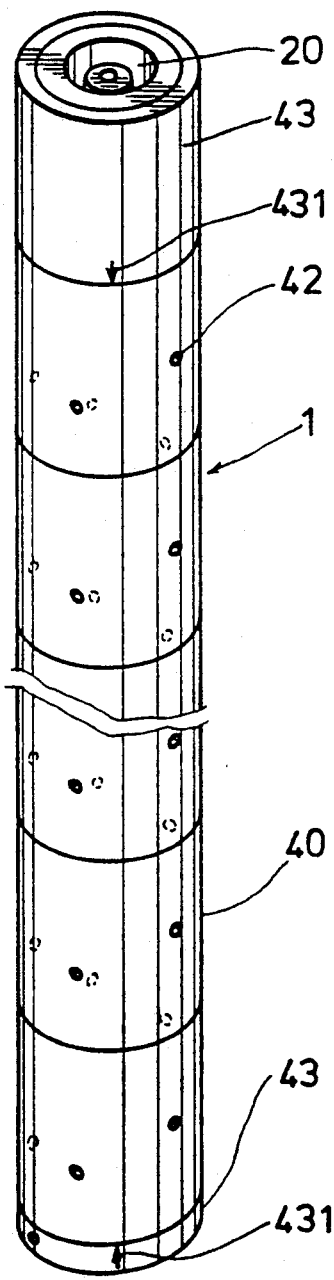
FIG. 1 shows a perspective view of a pressure gauge according to the present invention.
Figure 2:
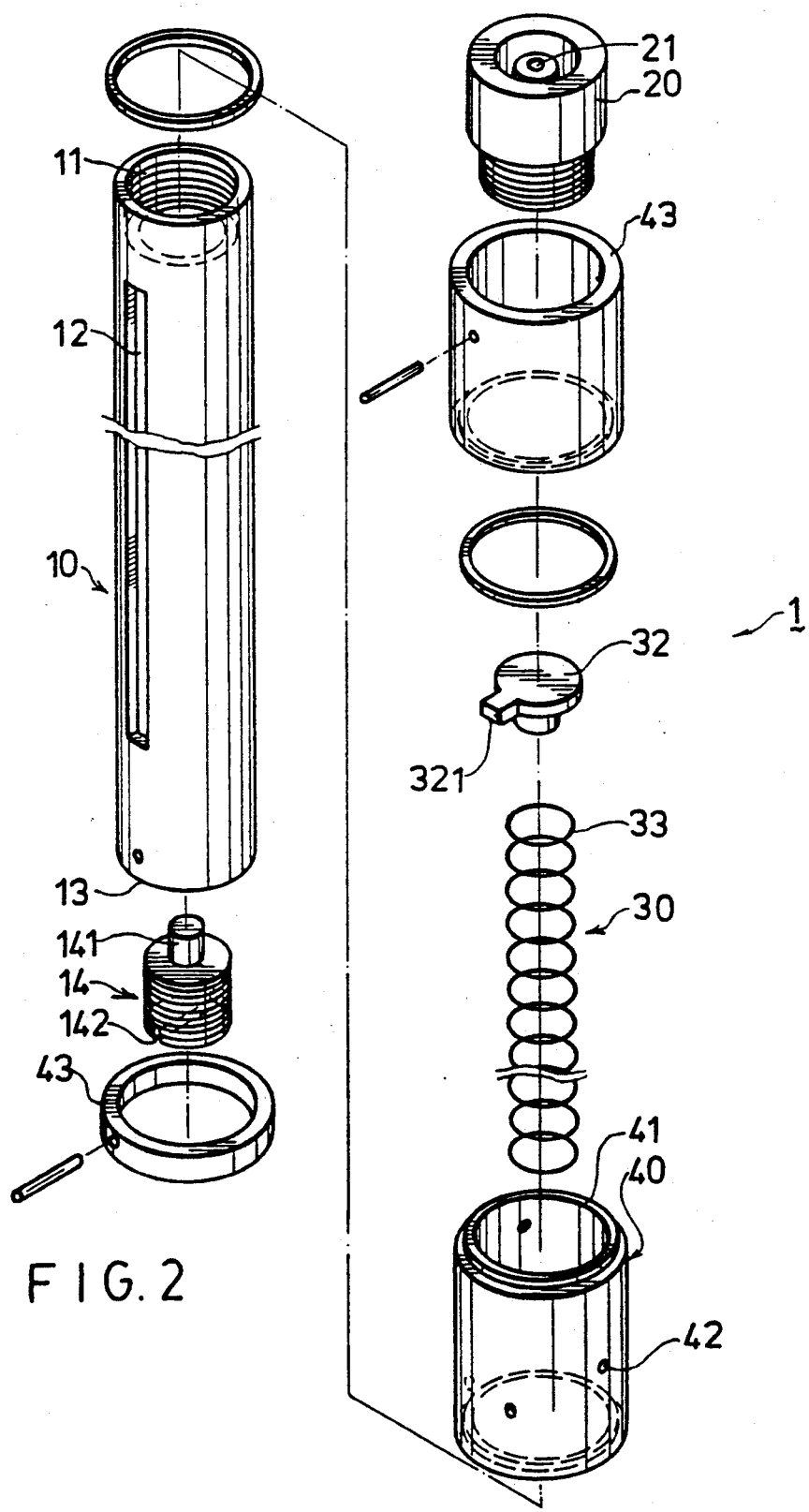
FIG. 2 is an exploded view of a pressure gauge according to the present invention.

Referring to FIGS. 1 and 2, a pen-type pressure gauge (1) of the present invention includes an elongated tubular member (10), a valve means (20), a resilient means (30), a sleeve member (40) and a pair of retaining rings (43).

The elongated tubular member (10), mostly metal pipe, has a top end (11) and a bottom end (13). A longitudinal groove (12) having a predetermined width, is formed on the elongated tubular member. A base member (14), can be made of any hard material, has a spring retainer (141) and a set of screw threads (142) at the bottom of the same, and is threadably connected to the bottom end (13) of the elongated tubular member. A pair of opposed extension (322) act as a stop member and extends inwardly from the inner wall of the tubular member adjacent to the top end of the same. See FIG. (3).

A sleeve member (40), can either be made of rubber or plastic material or metal, has a tubular form with connecting ends (41) to sealingly enclose the elongated tubular member (10). The special feature to be noted in this invention is the formation of holes (42) in the sleeve member (40). The holes (42) are staggered axially and circumferentially along the sleeve member (40). Each of them is spaced apart from the next by a predetermined arc length. The angular distance between adjacent holes measured circumferentially is greater than the predetermined width of the longitudinal groove of the elongated tubular member. Each of the holes on the sleeve member indicates a pre-arranged pressure valve. Therefore, one hole, indicating a particular pressure value, can be arranged by rotating the sleeve member to be aligned with the longitudinal groove of the elongated tubular member at one time.

A piston member (32) has a nose (321) and when the piston is provided in the elongated tubular member (10) between the pair of opposed extension (322) and the base member (14), the nose extends into the longitudinal groove. In this condition, the nose is sealingly in contact with the internal wall of the sleeve member and sealingly engages in the longitudinal groove of the elongated tubular member. The piston member can moves axially in the elongated tubular member while it sealingly engages the internal wall of the same.

A coil spring (33) is also disposed in the elongated tubular member between the piston member (32) and the base member (14) abutting the piston member (32) towards the pair of opposed extensions at the top end of the same. The tension force of the coil spring (30) can be adjusted by turning of the screw threads (142) of the base member (14).

A valve means (20) including a tube (21) to be connected to an inflating valve of a pneumatic tire, is connected to the top end of the tubular member. The construction of the valve means and its connection to the top end of the tubular member are conventional arts, therefore it is not necessary to explain them.

A pair of retaining rings (43), respectively connected to the top and bottom ends of the elongated tubular member retain the sleeve member in such a way that the sleeve member is not movable axially along the elongated tubular member, but is rotatable with respect to the elongated tubular member to adjust the hole (42) in aligned position with the longitudinal groove (12), as shown in FIG. 3. An indicator (431) is provided on each of the retaining rings (43) so that a user may arrange the hole (42) to be aligned with the longitudinal groove (12) just by setting the hole to be aligned with the indicator (431).

Figure 6:
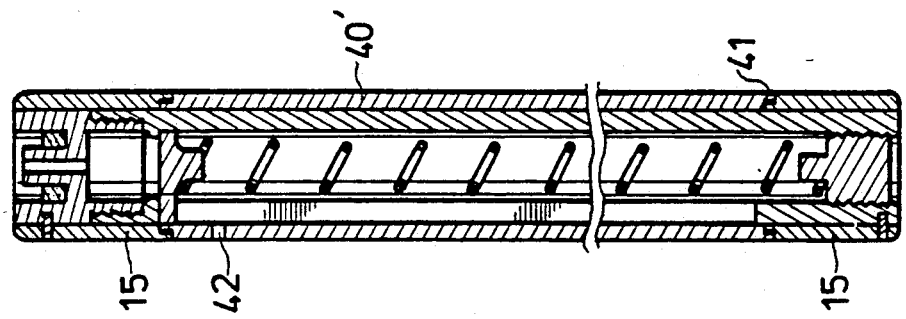
FIG. 6 shows a cross sectional view of a third preferred embodiment of a pressure gauge of the present invention.
Figure 5:
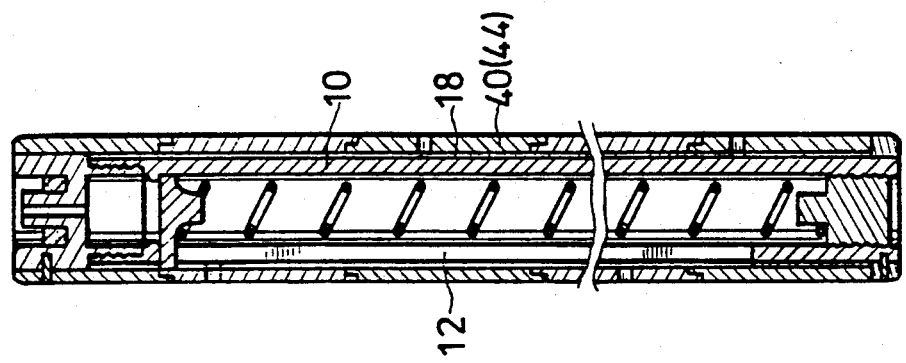
FIG. 5 shows a cross sectional view of a second preferred embodiment of a pressure gauge of the present invention.
Figure 4:
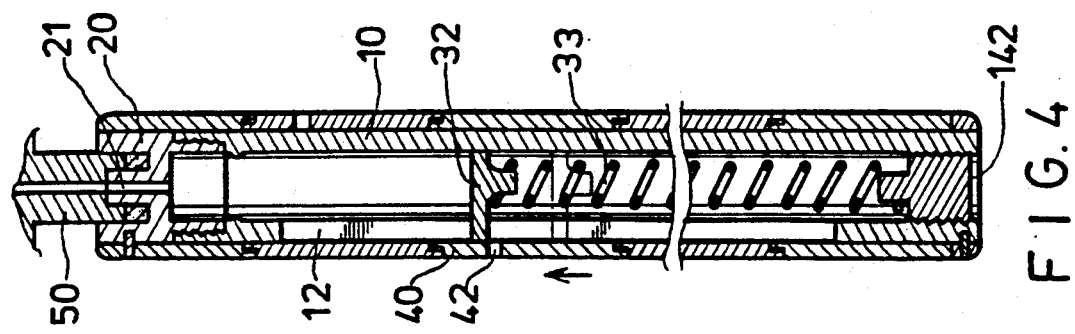
FIG. 4 shows a cross sectional view of a pressure gauge of present invention, in applied configuration.

In constructing the sleeve member, the sleeve member (40') can be a single tubular member adapted to fit over the elongated tubular member, (see FIG. 6), or it can be constructed into smaller tubular members (44) and joined together, as in FIG. 5. If the small tubular members are made of metal, an O-ring (402) can be provided between the connected smaller tubular members (40) which can prevent leakage of air pressure from between the two smaller tubular members, see FIG. 3(A). If it is required to make the sleeve member (40) stronger, a metal tubular member (401) can be sleeved over it, but must leave these holes uncover, as shown in FIG. 3(B). In the same manner, if a rubber tube is sleeved over the elongated tubular member, the rubber tube must leave the longitudinal groove uncovered so that the user may pre-arranged the particular hole indicating a particular pressure value of a connected tire.

Suppose that a tire of a minicab only needs 32 psi. Then, the user of the present pressure gauge can set the hole (42) marked 32 psi in advance. Filling of a tire by air compressor is an known art, and not concern with this invention and therefore will not be explained here. When the tube (21) of valve means (20) of the pressure gauge is connected to the inflating valve (50) of a pneumatic tire, which pressure we like to measure, the air inside the connected pneumatic tire pushes the piston member downward against the compression force of the coil spring and the piston member will stop only upon reaching the pre-arranged hole (42). If there is excessive pressure the pneumatic tire, the extra air pushes the piston member further downward than the pre-arranged hole, the excessive pressure is relieved by passage of the extra gas through the pre-arranged hole and the piston member is compressed back upward by the coil spring when there only a sufficient amount of required pressure in the pneumatic tire.

Figure 7:
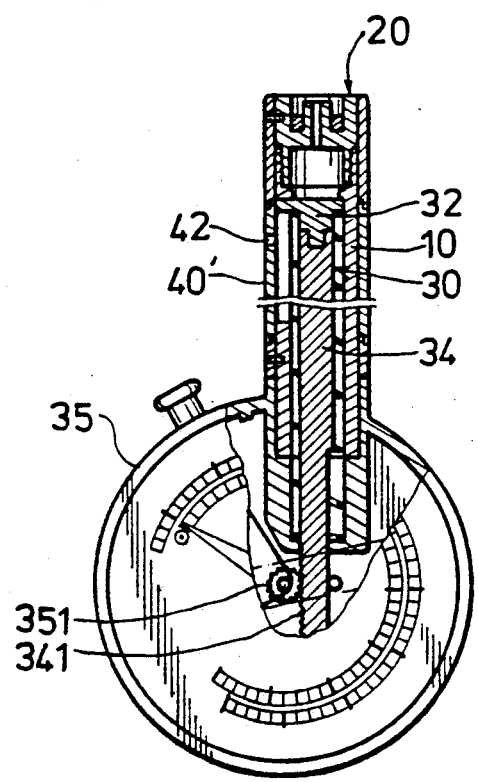
FIG. 7 shows another preferred embodiment of a pressure gauge of the present invention.

In another embodiment, as shown in FIG. 7, the bottom end of the sleeve member (40) is integrally formed with a housing (35) having an indicating board thereon. The elongated tubular member (10) has a slide rod (34) disposed under the piston member (32). One end (341) of the piston member (32) extends through the lower end of the sleeve member and connects to the indicator (351) of indicating board. The feature and function of the pressure gauge is same as already explained.

The unique feature of the present invention is that one can measure not only the amount of pressure in a tire but also release air to reach pre-set pressure from an excessive pressure.

With the invention thus explained, it is obvious to those skilled in the art that various modifications and variations can be made without departing from the scope and spirit of the present invention. It is therefore, intended that the invention be limited only as indicated in the appended claims.

I claim:

1. A pressure gauge comprising:

an elongated tubular member having a top end and a bottom end, a longitudinal groove being formed in said elongated tubular member which extends from the vicinity of said top end to the vicinity of said bottom end, said longitudinal groove having a predetermined width, a stop member being extended inwardly from the internal wall of said elongated tubular member adjacent to said top end of the same;

means for blocking said bottom end;

a sleeve member having a plurality of holes staggered axially and circumferentially along said sleeve member, each of said holes being spaced by a predetermined arc length, said sleeve member rotatably and sealingly sleeved around said elongated tubular member, each of said holes indicating a pre-arranged pressure value, the angular distance between adjacent said holes measured circumferentially being greater than said predetermined width of said longitudinal groove of said elongated tubular member, only one of said holes being aligned with said longitudinal groove of said elongated tubular member indicating said pre-arranged pressure value when said sleeve member is rotated to a position;

a piston member provided in said elongated tubular member between said blocking means of said bottom end and said stop member adjacent to said top end, said piston member having a nose extended into said longitudinal groove and sealingly in touch with the internal wall of said sleeve member and sealingly engaged along said longitudinal groove of said elongated tubular member, said piston member movable axially in said elongated tubular member while sealingly engaging the internal wall of said elongated tubular member;

a spring member disposed in said elongated tubular member between said blocking means and said piston member urging said piston member to abut said stop member;

a valve means for allowing a pressurized gas to enter said elongated tubular member through said top end of the same, said valve means being mounted on said top end of said elongated tubular member; and a pair of retaining members, respectively connected to said top end and said bottom end of said elongated tubular member, preventing said sleeve member from disengaging said elongated tubular member;

whereby when said pressurized gas enters said elongated tubular member through said valve means, said piston member can be pushed downward against the compression force of said spring member in said elongated tubular member towards said pre-arranged hole indicating said pre-arranged pressure value of the same by said pressurized gas, and allowing said pressurized gas to escape through said pre-arranged hole when said pressurized gas is under higher than said pre-arranged pressure value of said pre-arranged hole.

2. A pressure gauge as claimed in claim 1, wherein said blocking means is a cylindrical plug member having a top end and a bottom end, said top end having a spring retainer extended therefrom, said bottom end having a transverse groove therein, a set of screw threads being formed in said transverse groove.

3. A pressure gauge as claimed in claim 1, wherein said stop member is a pair of projections which extend inwardly from the internal wall of said elongated tubular member.

4. A pressure gauge as claimed in claim 1, wherein a rubber sleeve is provided between said elongated tubular member and said sleeve member.

5. A pressure gauge as claimed in claim 1, wherein said sleeve member includes a plurality of sleeve units, each being joined to another to form a sleeve member.

6. A pressure gauge as claimed in claim 1, wherein the bottom end of said sleeve member is connected to a housing, said housing having an indicator to indicate air pressure, said elongated tubular member further comprises a slide rod disposed underneath said piston member, one end of said slide rod extends through the bottom end of said sleeve member and connects to said indicator.

* * * * *